US011314741B2

(12) United States Patent
Marcel et al.

(10) Patent No.: US 11,314,741 B2
(45) Date of Patent: Apr. 26, 2022

(54) METADATA-BASED STATISTICS-ORIENTED PROCESSING OF QUERIES IN AN ON-DEMAND ENVIRONMENT

(71) Applicant: salesforce.com, inc., San Francisco, CA (US)

(72) Inventors: Cody Marcel, Denver, CO (US); Sahil Ramrakhyani, San Francisco, CA (US); Saikiran Perumala, San Francisco, CA (US); Brian Esserlieu, Walnut Creek, CA (US); Seshank Kalvala, San Francisco, CA (US)

(73) Assignee: salesforce.com, Inc., San Francisco, CA (US)

( * ) Notice: Subject to any disclaimer, the term of this patent is extended or adjusted under 35 U.S.C. 154(b) by 0 days.

(21) Appl. No.: 16/134,860

(22) Filed: Sep. 18, 2018

(65) Prior Publication Data

US 2019/0042622 A1 Feb. 7, 2019

Related U.S. Application Data

(63) Continuation-in-part of application No. 15/665,529, filed on Aug. 1, 2017.

(Continued)

(51) Int. Cl.

| | |
|---|---|
| ***G06F 16/2453*** | (2019.01) |
| ***G06F 16/28*** | (2019.01) |
| ***G06F 16/2455*** | (2019.01) |

(52) U.S. Cl.

CPC .... *G06F 16/24545* (2019.01); *G06F 16/2453* (2019.01); *G06F 16/24564* (2019.01); *G06F 16/283* (2019.01)

(58) Field of Classification Search

CPC .. G06F 16/489; G06F 16/71; G06F 16/24534; G06F 16/735; G06F 16/5033

See application file for complete search history.

(56) References Cited

U.S. PATENT DOCUMENTS 5,577,188 A 11/1996 Zhu
5,608,872 A 3/1997 Schwartz et al.

(Continued)

FOREIGN PATENT DOCUMENTS

EP 2439656 A1 * 4/2012 ....... G06F 16/24542
EP 2439656 A1 4/2012

OTHER PUBLICATIONS

Non-Final Office Action for U.S. Appl. No. 15/665,529 dated Aug. 19, 2019, 18 pages.

(Continued)

*Primary Examiner* — Ashish Thomas
*Assistant Examiner* — Abdullah A Daud
(74) *Attorney, Agent, or Firm* — Kwan & Olynick LLP

(57) ABSTRACT

In accordance with embodiments, there are provided mechanisms and methods for facilitating metadata-based statistics-oriented query processing for large datasets in an on-demand services environment. In one embodiment and by way of example, a method comprises evaluating metadata associated with a query placed on behalf of a tenant in a multi-tenant environment, and computing process statistics for the query based on the metadata, where the process statistics reveal an estimation of resources needed for execution of the query within a predictable amount of time and using fewer than or equal to an allocated number of scans of a database. The method may further include associating, based on the process statistics, a set of rules and the estimated resources to process the query, and executing the query based on the set of rules and using the estimated resources such that the query is processed within the predictable amount of time and (Continued)

using fewer than or equal to the allocated number of scans of the database.

18 Claims, 11 Drawing Sheets

Related U.S. Application Data

(60) Provisional application No. 62/686,604, filed on Jun. 18, 2018.

(56) References Cited

U.S. PATENT DOCUMENTS 5,649,104 A 7/1997 Carleton et al.
5,715,450 A 2/1998 Ambrose et al.
5,761,419 A 6/1998 Schwartz et al.
5,819,038 A 10/1998 Carleton et al.
5,821,937 A 10/1998 Tonelli et al.
5,831,610 A 11/1998 Tonelli et al.
5,845,276 A * 12/1998 Emerson ................ G06Q 30/02
5,873,096 A 2/1999 Lim et al.
5,918,159 A 6/1999 Fomukong et al.
5,963,953 A 10/1999 Cram et al.
6,092,083 A 7/2000 Brodersen et al.
6,169,534 B1 1/2001 Raffel et al.
6,178,425 B1 1/2001 Brodersen et al.
6,189,011 B1 2/2001 Lim et al.
6,216,135 B1 4/2001 Brodersen et al.
6,233,617 B1 5/2001 Rothwein et al.
6,266,669 B1 7/2001 Brodersen et al.
6,295,530 B1 9/2001 Ritchie et al.
6,324,568 B1 11/2001 Diec
6,324,693 B1 11/2001 Brodersen et al.
6,336,137 B1 1/2002 Lee et al.
D454,139 S 3/2002 Feldcamp
6,367,077 B1 4/2002 Brodersen et al.
6,393,605 B1 5/2002 Loomans
6,405,220 B1 6/2002 Brodersen et al.
6,434,550 B1 8/2002 Warner et al.
6,446,089 B1 9/2002 Brodersen et al.
6,535,909 B1 3/2003 Rust
6,549,908 B1 4/2003 Loomans
6,553,563 B2 4/2003 Ambrose et al.
6,560,461 B1 5/2003 Fomukong et al.
6,574,635 B2 6/2003 Stauber et al.
6,577,726 B1 6/2003 Huang et al.
6,601,087 B1 7/2003 Zhu et al.
6,604,117 B2 8/2003 Lim et al.
6,604,128 B2 8/2003 Diec
6,609,150 B2 8/2003 Lee et al.
6,621,834 B1 9/2003 Scherpbier et al.
6,654,032 B1 11/2003 Zhu et al.
6,665,648 B2 12/2003 Brodersen et al.
6,665,655 B1 12/2003 Warner et al.
6,684,438 B2 2/2004 Brodersen et al.
6,711,565 B1 3/2004 Subramaniam et al.
6,724,399 B1 4/2004 Katchour et al.
6,728,702 B1 4/2004 Subramaniam et al.
6,728,960 B1 4/2004 Loomans
6,732,095 B1 5/2004 Warshavsky et al.
6,732,100 B1 5/2004 Brodersen et al.
6,732,111 B2 5/2004 Brodersen et al.
6,754,681 B2 6/2004 Brodersen et al.
6,763,351 B1 7/2004 Subramaniam et al.
6,763,501 B1 7/2004 Zhu et al.
6,768,904 B2 7/2004 Kim
6,782,383 B2 8/2004 Subramaniam et al.
6,804,330 B1 10/2004 Jones et al.
6,826,565 B2 11/2004 Ritchie et al.
6,826,582 B1 11/2004 Chatterjee et al.
6,826,745 B2 11/2004 Coker et al.
6,829,655 B1 12/2004 Huang et al.
6,842,748 B1 1/2005 Warner et al.
6,850,895 B2 2/2005 Brodersen et al.
6,850,949 B2 2/2005 Warner et al.
7,289,976 B2 10/2007 Kihneman et al.
7,299,239 B1 * 11/2007 Basu ....................... G06F 16/28
7,340,411 B2 3/2008 Cook
7,620,655 B2 11/2009 Larsson et al.
8,160,074 B1 * 4/2012 Krishnan .............. H04L 45/021 370/395.31
8,655,867 B2 * 2/2014 Collins ............. G06F 16/24532 707/719
2001/0044791 A1 11/2001 Richter et al.
2002/0022986 A1 2/2002 Coker et al.
2002/0029161 A1 3/2002 Brodersen et al.
2002/0029376 A1 3/2002 Ambrose et al.
2002/0035577 A1 3/2002 Brodersen et al.
2002/0042264 A1 4/2002 Kim
2002/0042843 A1 4/2002 Diec
2002/0072951 A1 6/2002 Lee et al.
2002/0082892 A1 6/2002 Raffel et al.
2002/0129352 A1 9/2002 Brodersen et al.
2002/0140731 A1 10/2002 Subramaniam et al.
2002/0143997 A1 10/2002 Huang et al.
2002/0152102 A1 10/2002 Brodersen et al.
2002/0161734 A1 10/2002 Stauber et al.
2002/0162090 A1 10/2002 Parnell et al.
2002/0165742 A1 11/2002 Robins
2002/0194157 A1 * 12/2002 Zait ................... G06F 16/24557
2003/0004971 A1 1/2003 Gong et al.
2003/0018705 A1 1/2003 Chen et al.
2003/0018830 A1 1/2003 Chen et al.
2003/0066031 A1 4/2003 Laane
2003/0066032 A1 4/2003 Ramachadran et al.
2003/0069936 A1 4/2003 Warner et al.
2003/0070000 A1 4/2003 Coker et al.
2003/0070004 A1 4/2003 Mukundan et al.
2003/0070005 A1 4/2003 Mukundan et al.
2003/0074418 A1 4/2003 Coker
2003/0088545 A1 5/2003 Subramaniam et al.
2003/0120675 A1 6/2003 Stauber et al.
2003/0151633 A1 8/2003 George et al.
2003/0159136 A1 8/2003 Huang et al.
2003/0187921 A1 10/2003 Diec
2003/0189600 A1 10/2003 Gune et al.
2003/0191743 A1 10/2003 Brodersen et al.
2003/0204427 A1 10/2003 Gune et al.
2003/0206192 A1 11/2003 Chen et al.
2003/0225730 A1 12/2003 Warner et al.
2004/0001092 A1 1/2004 Rothwein et al.
2004/0010489 A1 1/2004 Rio
2004/0015981 A1 1/2004 Coker et al.
2004/0027388 A1 2/2004 Berg et al.
2004/0128001 A1 7/2004 Levin et al.
2004/0133568 A1 * 7/2004 Witkowski ............ G06F 16/244
2004/0186860 A1 9/2004 Lee et al.
2004/0193510 A1 9/2004 Catahan, Jr. et al.
2004/0199489 A1 10/2004 Barnes-Leon et al.
2004/0199536 A1 10/2004 Barnes-Leon et al.
2004/0199543 A1 10/2004 Braud et al.
2004/0249845 A1 * 12/2004 Das ................... G06F 16/24557
2004/0249854 A1 12/2004 Barnes-Leon et al.
2004/0260534 A1 12/2004 Pak et al.
2004/0260659 A1 12/2004 Chan et al.
2004/0268299 A1 12/2004 Lei et al.
2005/0050555 A1 3/2005 Exley et al.
2005/0091098 A1 4/2005 Brodersen et al.
2006/0074874 A1 * 4/2006 Day ................. G06F 16/24549
2007/0174329 A1 * 7/2007 Anderson ............. G06F 16/217
2009/0150541 A1 * 6/2009 Georgis .................. G06F 9/451 709/224
2009/0177744 A1 7/2009 Marlow et al.
2010/0293161 A1 * 11/2010 Poppe ............... G06F 16/24534 707/736
2011/0137890 A1 * 6/2011 Bestgen ............ G06F 16/24544 707/719
2011/0313999 A1 12/2011 Bruno et al.
2012/0191698 A1 * 7/2012 Albrecht ............. G06F 16/2453 707/718
2012/0330924 A1 * 12/2012 Rajan .................. G06F 16/2453 707/714

(56) References Cited

U.S. PATENT DOCUMENTS

| | | | | |
|---|---|---|---|---|
| 2014/0365683 | A1* | 12/2014 | Bergman | H04L 67/2852 709/238 |
| 2015/0052150 | A1* | 2/2015 | Sharique | G06F 16/2255 707/747 |
| 2015/0067646 | A1 | 3/2015 | Singhal et al. | |
| 2015/0154255 | A1* | 6/2015 | Cole | G06F 16/24542 707/718 |
| 2015/0281307 | A1* | 10/2015 | Hartwell | H04L 65/604 709/219 |
| 2016/0098448 | A1* | 4/2016 | McShane | G06F 40/205 707/713 |
| 2016/0267134 | A1* | 9/2016 | Briggs | G06F 16/24542 |
| 2016/0335318 | A1* | 11/2016 | Gerweck | G06F 16/2282 |
| 2017/0031967 | A1* | 2/2017 | Chavan | G06F 16/2453 |
| 2017/0068710 | A1* | 3/2017 | Burger | G06F 16/217 |
| 2017/0097957 | A1* | 4/2017 | Bourbonnais | G06F 16/24554 |
| 2017/0116276 | A1* | 4/2017 | Ziauddin | G06F 16/24532 |
| 2017/0147636 | A1* | 5/2017 | Weyerhaeuser | G06F 16/24554 |
| 2017/0308555 | A1* | 10/2017 | Hirzel | G06F 16/2433 |
| 2018/0165171 | A1* | 6/2018 | VanBuskirk | G06F 11/2257 |
| 2018/0218041 | A1* | 8/2018 | Arthanarisamy | G06F 16/24542 |
| 2018/0336246 | A1* | 11/2018 | Dasam | G06F 16/24545 |
| 2019/0034496 | A1* | 1/2019 | Acosta | G06F 16/2471 |
| 2019/0095265 | A1* | 3/2019 | Dome | G06F 11/3419 |
| 2019/0332591 | A1* | 10/2019 | Chen | G06F 16/2282 |

OTHER PUBLICATIONS

Non-Final Office Action for U.S. Appl. No. 16/134,857 dated Aug. 28, 2019, 21 pages.
Corrected Notice of Allowability for U.S. Appl. No. 16/134,857 dated Mar. 24, 2021, 9 pages.
Non-Final Office Action for U.S. Appl. No. 15/665,529 dated May 12, 2021, 27 pages.
Notice of Allowance for U.S. Appl. No. 16/134,857 dated Mar. 9, 2021, 11 pages.
Final Office Action for U.S. Appl. No. 15/665,529 dated Jul. 1, 2020, 21 pages.
Final Office Action for U.S. Appl. No. 16/134,857 dated May 20, 2020, 21 pages.
Corrected Notice of Allowability for U.S. Appl. No. 16/134,857 dated Jun. 24, 2021, 9 pages.

* cited by examiner

METADATA-BASED STATISTICS-ORIENTED PROCESSING OF QUERIES IN AN ON-DEMAND ENVIRONMENT

RELATED APPLICATIONS

This continuation-in-part application claims the benefit of and priority to U.S. patent application Ser. No. 15/665,529, entitled RULES-BASED SYNCHRONOUS QUERY PROCESSING FOR LARGE DATASETS IN AN ON-DEMAND ENVIRONMENT, by Cody Marcel et al., filed Aug. 1, 2017, and also claims the benefit of and priority to U.S. provisional patent application No. 62/686,604, entitled BIG DATA QUERY PROCESSING AND STATISTICS-BASED SOQL IN AN ON-DEMAND ENVIRONMENT, by Cody Marcel et al., filed Jun. 18, 2018, the entire contents of the above-referenced non-provisional and provisional patent applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management; more specifically, to facilitating rules-based synchronous query processing for large datasets in an on-demand services environment.

BACKGROUND

One of the fundamental problems with performing queries in large datasets is the unpredictability of query times. For example, when a synchronous query is issued in a large dataset, it typically fails to return results within any expected time frame and this gets even worse if the large data set begins or continues to get larger. When operating at scales of hundreds of millions to even billions of rows, queries resulting in full table or large scans can easily result in timeout situations. This typically leads to unpredictable and frustrating user experience where even the exact same query experiences variable response times based on the size of the data set.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
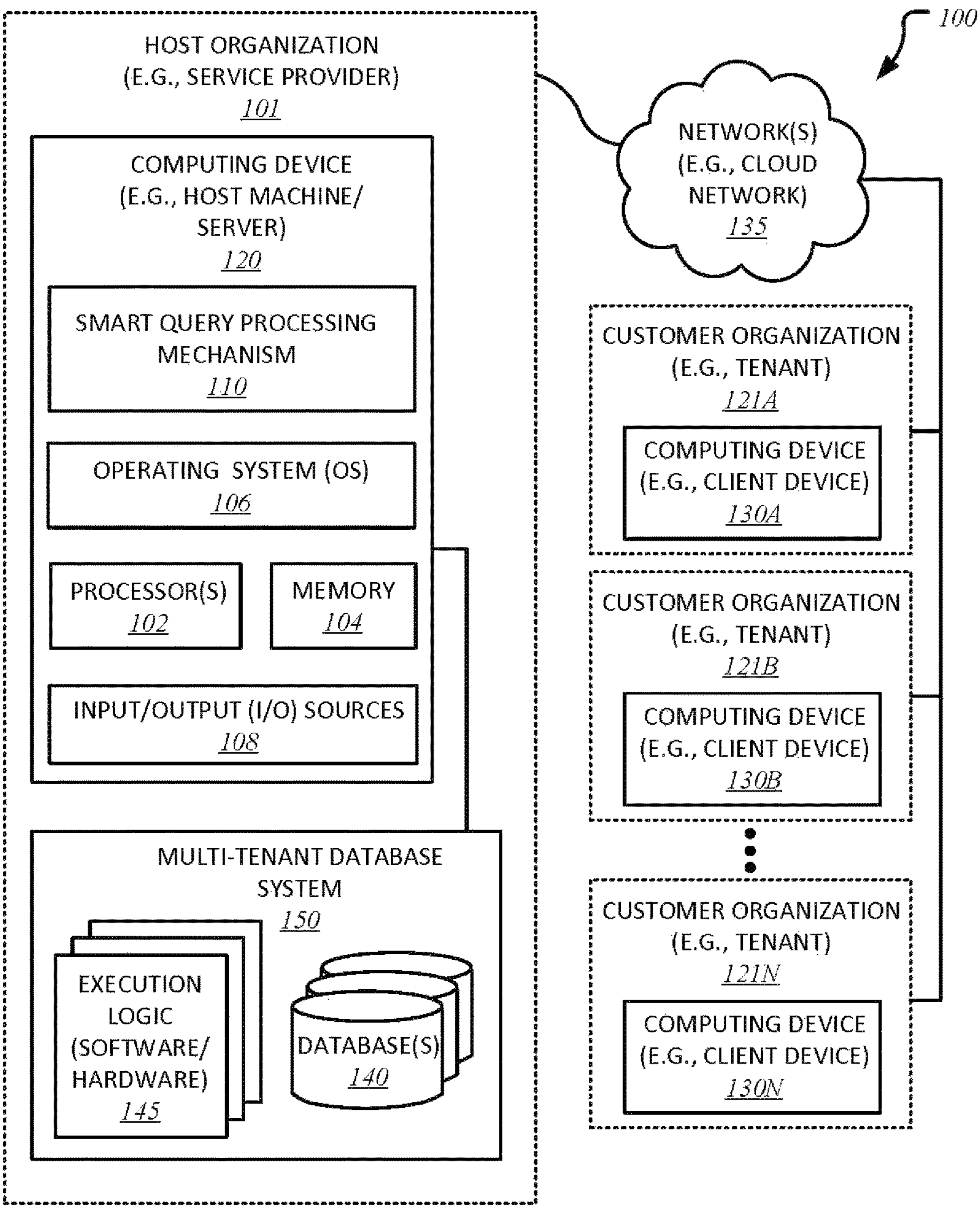
FIG. 1 illustrates a system having a computing device employing a smart query processing mechanism according to one embodiment.

In the following description, numerous specific details are set forth. However, embodiments of the invention may be practiced without these specific details. In other instances, well-known circuits, structures and techniques have not been shown in detail in order not to obscure the understanding of this description.

Embodiments provide for a novel technique for facilitating rules-based synchronous query processing for large datasets in an on-demand services environment. In one embodiment, to ensure only optimal queries are issued within predictable time frames, a series of rules is applied to block or promote certain known patterns. For example, when a synchronous query is run through, it is processed through a set of rules in, for example, a Query Analyzer, where, at high-level, these rules are designed to fail fast and prevent query classes that are known to be inefficient from running.

This novel technique provides for a tunable and dynamic multi-tenant fairness for synchronous big data queries, where predictability of response times for custom queries is honored regardless of data size. Further, for example, service protection algorithm may be provided to identify query patterns for efficient execution before submission. Embodiments further provide for blocking of queries at runtime based on data shape (e.g., force.com metadata) while the query runs. All the while, the user or customer on the client-end faces a facade of the usual system through a user interface so that there are no unwanted surprises or inconveniences for the user.

It is contemplated that embodiments and their implementations are not merely limited to multi-tenant database system ("MTDBS") and can be used in other environments, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a smart query processing mechanism ("query mechanism") 110 according to one embodiment. In one embodiment, computing device 120 includes a host server computer serving a host machine for employing query mechanism 110 for facilitating bundling of and providing connection between packages and customizations in a multi-tiered, multi-tenant, on-demand services environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types, which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc.), etc., serving as a customer or client of host organization 101 (also referred to as "service provider" or simply "host"), such as Salesforce.com®, serving as a host of query mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitation) one or more of customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
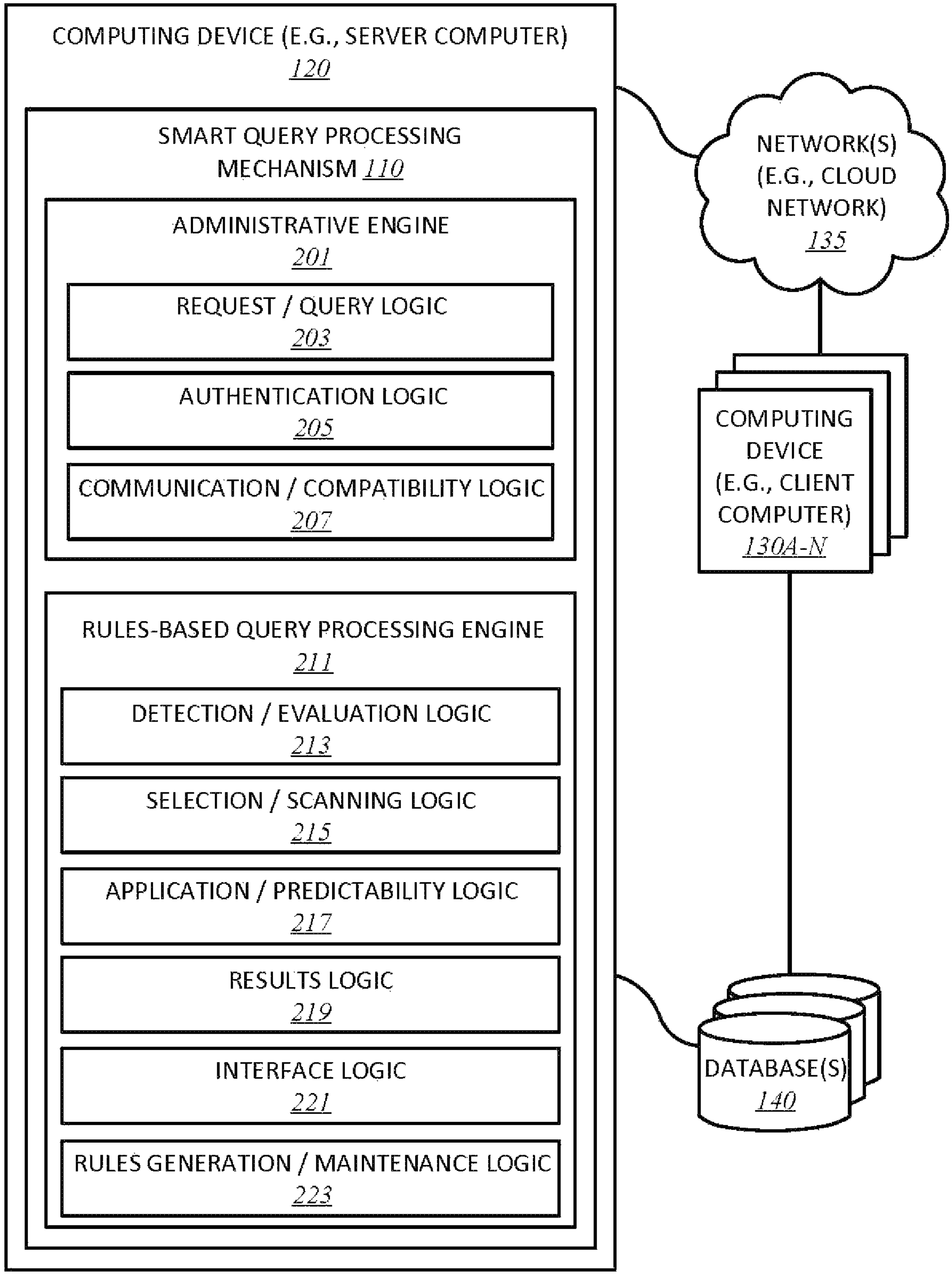
FIG. 2 illustrates a smart query processing mechanism according to one embodiment.

FIG. 2 illustrates query mechanism 110 of FIG. 1 according to one embodiment. In one embodiment, query mechanism 110 may include any number and type of components, such as administration engine 201 having (without limitation): request/query logic 203; authentication logic 205; and communication/compatibility logic 207. Similarly, query mechanism 110 may further include rules-based query processing engine ("rules engine") 211 including (without limitation): detection/evaluation logic 213; selection/scanning logic 215; application/predictability logic 217; results logic 219; interface logic 221; and rules generation/maintenance logic 223.

In one embodiment, computing device 120 may serve as a service provider core (e.g., Salesforce.com® core) for hosting and maintaining query mechanism 110 and be in communication with one or more database(s) 140, one or more client computers 130A-N, over one or more network (s) 135, and any number and type of dedicated nodes. In one embodiment, one or more database(s) 140 may host a set of rules 141.

Throughout this document, terms like "framework", "mechanism", "engine", "logic", "component", "module", "tool", and "builder" may be referenced interchangeably and include, by way of example, software, hardware, and/or any combination of software and hardware, such as firmware. Further, any use of a particular brand, word, or term, such as "query", "synchronization", "rules-based query processing", "rules", "rules engine", "matching", "executing", "anticipating", "scanning", "blocking", "query failure", "predictability of time", "time frame", "metadata", "customization", "testing", "updating", "upgrading", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of one or more client devices 130A-N, code execution requests, and so forth.

In one embodiment, computing device 120 may implement request/query logic 203 to serve as a request/query interface via a web server or as a stand-alone interface to receive requests packets or other requests from the client devices 130A-N. The request interface may further support the return of response packets or other replies and responses in an outgoing direction from computing device 120 to one or more client devices 130A-N.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via one or more client devices 130A-N.

In one embodiment, computing device 120 may include a server computer which may be further in communication with one or more databases or storage repositories, such as database(s) 140, which may be located locally or remotely over one or more networks, such as network(s) 235 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices 130A-N, over one or more communication mediums, such as network(s) 140.

In one embodiment, as illustrated, query mechanism 110 includes rules engine 211 to allow for a novel technique for rules-based processing of user queries associated with tenants in a multi-tenant environment. In embodiment, rules engine 211 is used to ensure only optimal queries are issued and processed through selection and application of a series of rules 141 so that certain query processing patters may be blocked or promoted. When a synchronous query is run through, it is processed through a set of rules using, for example, a Query Analyzer (or simply QueryAnalyzer), where, at high-levels, such rules are designed fail or prevent query classes that are known to be inefficient from running, while promoting other queries to run efficiently within correspondingly predictable time periods/frames.

For example, once a query is received from a user associated with a customer/tenant in a multi-tenant environment, the query is first detected and then evaluated by detection/evaluation logic 213. In one embodiment, the evaluation of the query may include anticipating processing patterns of the query based on historical data obtained from one or more database(s) 140. For example, the same or a similar query may have been processed in the past for one or more users or tenant and accordingly, detection/evaluation logic 213 may be used to extract the historical processing patterns associated with the query to determine one or more protocols or components, such as query classes, etc., relating to the query that be me regarded as unnecessary or inefficient, etc., based on rules 141 as generated and maintained by generation/maintenance logic 223.

Further, for example, detection/evaluation logic 213 may be used to describe a set of rules 141 relevant to the query so that an evaluation may be conducted as to further determine the type of query in terms of the amount and/or type of data needed to be accessed at one or more database(s) 140. For example, whether the query is likely to be inefficient in needing a large amount or big scan of data in generating appropriate results in response to the query or efficient in necessitating a small amount or scan of data at one or more database(s) 140.

In one embodiment, any information obtained through the evaluation of the query may then be used by selection/scanning logic 215 to select processing entities, such as one or more of rules 141, protocols, processes, data sets from one or more database(s) 140, etc., so that the query may be processed efficiently and effectively. For example, distributed, scalable, and big data storage layers, such as Apache HBase™, may be used in combination with and as facilitated by selection/scanning logic 215 to quickly optimize and efficiently find small data sets within large data sets at one or more database(s) 140 to process the query such that the query may be processed and results to the query may be obtained within expected or predictable time frames even if the data sets get larger or increasingly complex with time.

In one embodiment, one or more of the selected processing entities, such as one or more of rules 141, may then be used or applied by selection/scanning logic 215 to scan the selected small sets of data at one or more database(s) 140 to ensure the query is processed optimally by ending or blocking out any unfavorable processing patterns associated with the query, while allowing favorable processing patterns associated with the query to be processed using the one or more of rules 141. For example, when the query may be synchronously run through a processing platform such that the query is processed through the one or more of rules 141 in query analyzer, such as QueryAnalyzer#assertFastQuery( ) method. In some embodiments, query analyzer may serve as a top-level method for all synchronous queries to flow through and house the various rules that are applied against the query. In some embodiments, one or more of the rules 141 may be used to prevent certain query classes that are known to be inefficient from running, while allowing efficient query classes to run to allow for those queries that rely on scanning of small data sets on, for example, HBase', of one or more database(s) 140 to run and be processed.

With regard to rules 141, in one embodiment, rules generation/maintenance logic 223 may be used to generate rules 141 and maintain them at one or more database(s) 140 and while reviewing rules 141, the order of the columns in a primary key may be regarded and considered as a source of truth achieving query efficiency. These rules 141 may revolve around a row key for a table being queried along with any relevant or applicable language, such as Salesforce Object Query Language (SOQL) for searching text values across multiple fields and object types in a single operation, etc. Further, for example, queries may be bound by columns positions in the primary key (PK) that are then filtered using certain clauses, such as the WHERE, ORDER BY, etc., clauses. One of the reasons for this is to prevent a full and really large range scans of large data sets at one or more database(s) 140, while intuitively, a range scan may seem innocuous, cases relating to high cardinality on columns within the key may be an issue. For example, if a key is UID, EVENT_LOC, TIME_STMP, a relevant query may seem as necessitating a range scan of or through millions of rows if the events are occurring at several locations. This might occur even if there are only a few rows between the prime range.

Some examples of rules 141 may include optional rules, such as UnsupportedFilterCreateSkipScan to perform skip scan to improve efficiency of a range scan as defined by a property using skip scan filter method. For example, if range scan is not allowed, any query where this property is set is blocked and any queries containing a range (RangeQuery-FilterOperation) on a PK column that are not last and equality on the last column may trigger this behavior.

Another example of rules 141 may include Unsupported-AggregationGeneric, where aggregate functions on projections, such as anything within the SELECT statement, may not be allowed. For example, aggregates, by name, may necessitate full table scans of the data to be accurate and count(*) may not be performed without vising every row and executing a full scan. Additionally, some aggregates may necessitate sorting or operating on a full returned set to produce correct results, such as paged results, top N queries, AVG, etc.

Other examples of rules 141 may include Unsupported-GroupBy, UnsupportedHaving, UnsupportedRangeFilter-WithRightMostPKCol, UnsupportedFilterWithPKGaps, etc. For example, UnsupportedRangeFilterWithRight-MostPKCol ensures Range QueryFilterOperation filters are only the rightmost (e.g., least significant) part of a row key, where this rule may be applied to a filter criteria's relative position with the key. Similarly, for example, Unsupported-FilterWithPKGaps, etc., may cover the row key in order and without any gaps between columns. Some of these rules, such as PK ordering, may be regarded as the primary manner in which to differentiate between a point get and a range scan. This smart and novel technique allows for not blocking of everything, since there are several permutations of the row key that results in valid and efficient queries.

Additional examples of rules 141 may further include UnsupportedFilterOperation, UnsupportedCompoundFilter-Type, UnsupportedOrderDirection, UnsupportedOrderby-WithNullsLast, etc. For example, UnsupportedFilterOperation allows for breaking apart of query filters and applying a number of rules based on operations, where filter is on a column defined with the PK, etc. Similarly, UnsupporedOr-derDirection relates to ORDER By having an even more restrictive support. The column may align with the order of the row key without out any gaps on the left. The order direction may also match the column order direct applied to the schema. If the row key on a date for example may include ASC, the ORDER BY as queried ASC, etc.

In one embodiment, application/predictability logic 217 is then triggered to use the information obtained from scanning of small data sets by selection/scanning logic 215 to ensure that all relevant and necessary processing entities are applied so that the query is processed efficiently within an expected or predictable time period. Stated differently, even if the overall data sets have grown, the query is processed using smaller data sets to allow results logic 219 to generate results based on any information obtained from application/predictability logic 217. For example, it is contemplated that this rules algorithm ensures that the runtime of the query remains the same whether a data set has a thousand rows or a billion rows in it. Further, rows may be returned if the data set grows, but more data may not be scanned over to find them as this may be retrieved through direct access. For example, results logic 219 generates results that are then transmitted on to the user having access to one or more computing device(s) 130A-N over one or more network(s) 135 (e.g., cloud network), where the results serve as or are contained in a response to the query and offered to the user within a predictable time frame.

These results may be accessed and/or viewed by the user through a user interface at one or more computing device(s) 130A-N as facilitated by interface logic 221 without noticing any significant difference or encountering any inconvenience in receiving and viewing the results. In one embodiment, interface logic 221 may be used to offer access to packages and customizations to users, such as software developers, end-users, etc., though one or more interfaces at one or more computing devices 120, 130A-N using one or more of their display devices/screens as further facilitated by communication/compatibility logic 207. It is contemplated that the one or more interfaces are not limited to any particular number or type of interfaces such that an interface may include (without limitations) any one or more of a user interface (e.g., Web browser, Graphical User Interface (GUI), software application-based interface, etc.), an application programming interface (API), a Representational State Transfer (REST) or RESTful API, and/or the like.

It is contemplated that a tenant may include an organization of any size or type, such as a business, a company, a corporation, a government agency, a philanthropic or non-profit entity, an educational institution, etc., having single or multiple departments (e.g., accounting, marketing, legal, etc.), single or multiple layers of authority (e.g., C-level positions, directors, managers, receptionists, etc.), single or multiple types of businesses or sub-organizations (e.g., sodas, snacks, restaurants, sponsorships, charitable foundation, services, skills, time etc.) and/or the like.

Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

It is contemplated that any number and type of components may be added to and/or removed from query mechanism 110 to facilitate various embodiments including adding, removing, and/or enhancing certain features. It is contemplated that embodiments are not limited to any particular technology, topology, system, architecture, and/or standard and are dynamic enough to adopt and adapt to any future changes.

Figure 3:
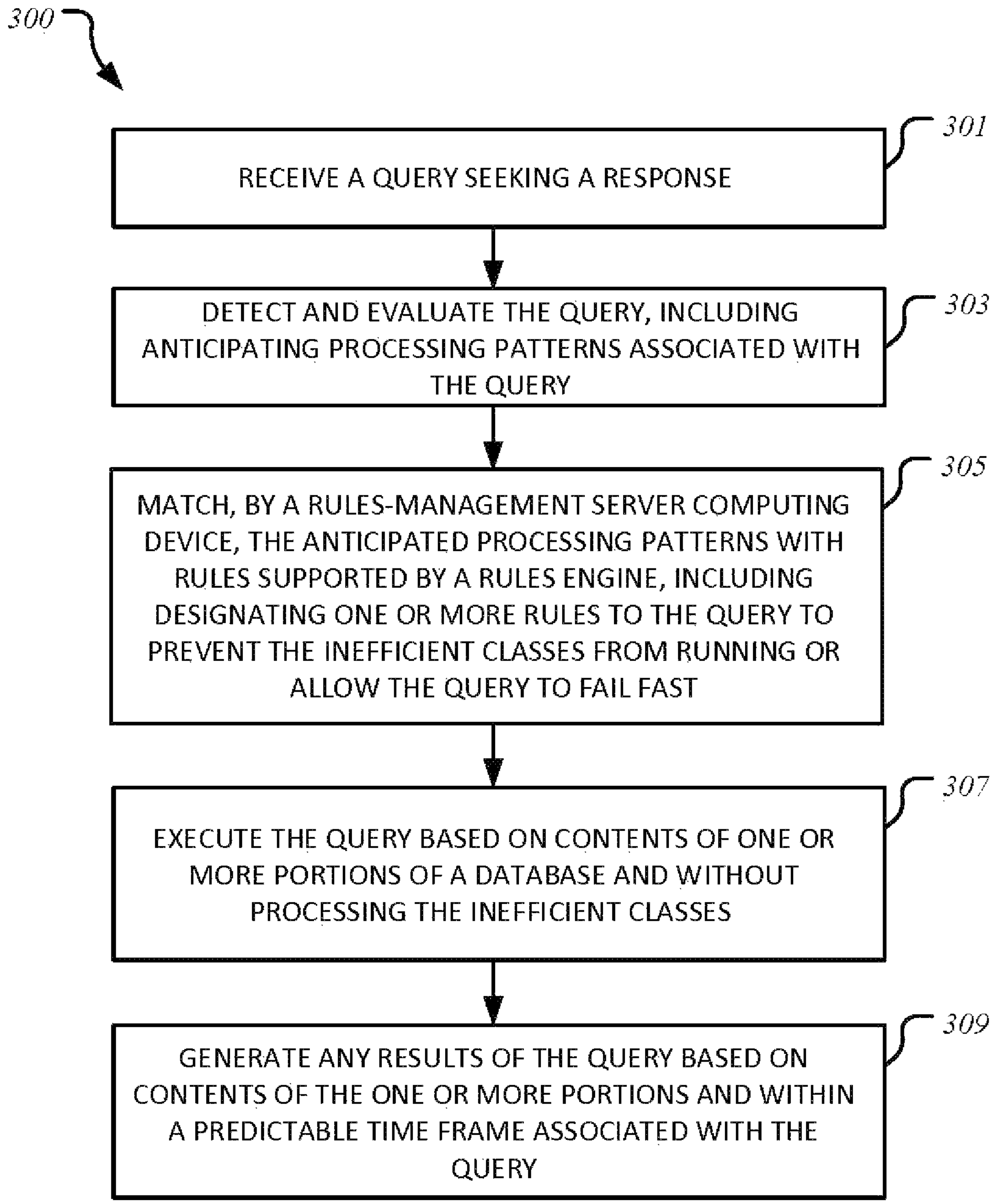
FIG. 3 illustrates a method for facilitating rules-based processing of queries according to one embodiment.

FIG. 3 illustrates a method 300 for facilitating rules-based processing of queries according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed or facilitated by one or more components of query mechanism 110 of FIGS. 1-2. The processes of method 300 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

Method 300 begins at block 301 with receiving of a query seeking a response, wherein the query is received from a user associated with a tenant in a multi-tenant environment and that the query is placed by the user using a computing device through a user interface. For example, the query may be one of several queries received any number of users associated with any number of tenants in a multi-tenant environment. In one embodiment, at block 303, the query is detected and evaluated by detection/evaluation logic 213 of FIG. 2 such that prior to processing or execution of the query, processing patterns of the query are anticipated based on, for example, historical performances associated with the query or any one or more other queries similar to or the same as the query.

At block 305, the anticipated processing patterns are matched against a set of rules being maintained by rules engine 211 at one or more database(s) 140 of FIG. 2, where this matching allows for identification of one or more portions or data sets of a larger data set at one or more database(s) 140 of FIG. 2 as being relevant to processing of the query. In one embodiment, matching includes detecting at least one of one or more efficient classes and one or more inefficient classes associated with the query, and designating one or more of the set of rules to the one or more inefficient classes associated with the query to prevent the one or more inefficient classes from being processed or allow the query to fail fast. Similarly, designating one or more of the set of rules to the one or more efficient classes to ensure the query is processed based on the one or more efficient classes.

In one embodiment, at block 307, the query is executed based on the set of rules by scanning smaller portions or sets of data to access their contents, which may then be used for generating results in response to the query, without having to process the one or more inefficient classes. At block 309, results to the query are generated based on the contents within a predictable period/frame of time associated with the query. In one embodiment, there is at least one predictable frame of time associated with each query, where this predictable time frame represents the amount of time users anticipate would take the system to process the corresponding query and provide the results.

Figure 4:
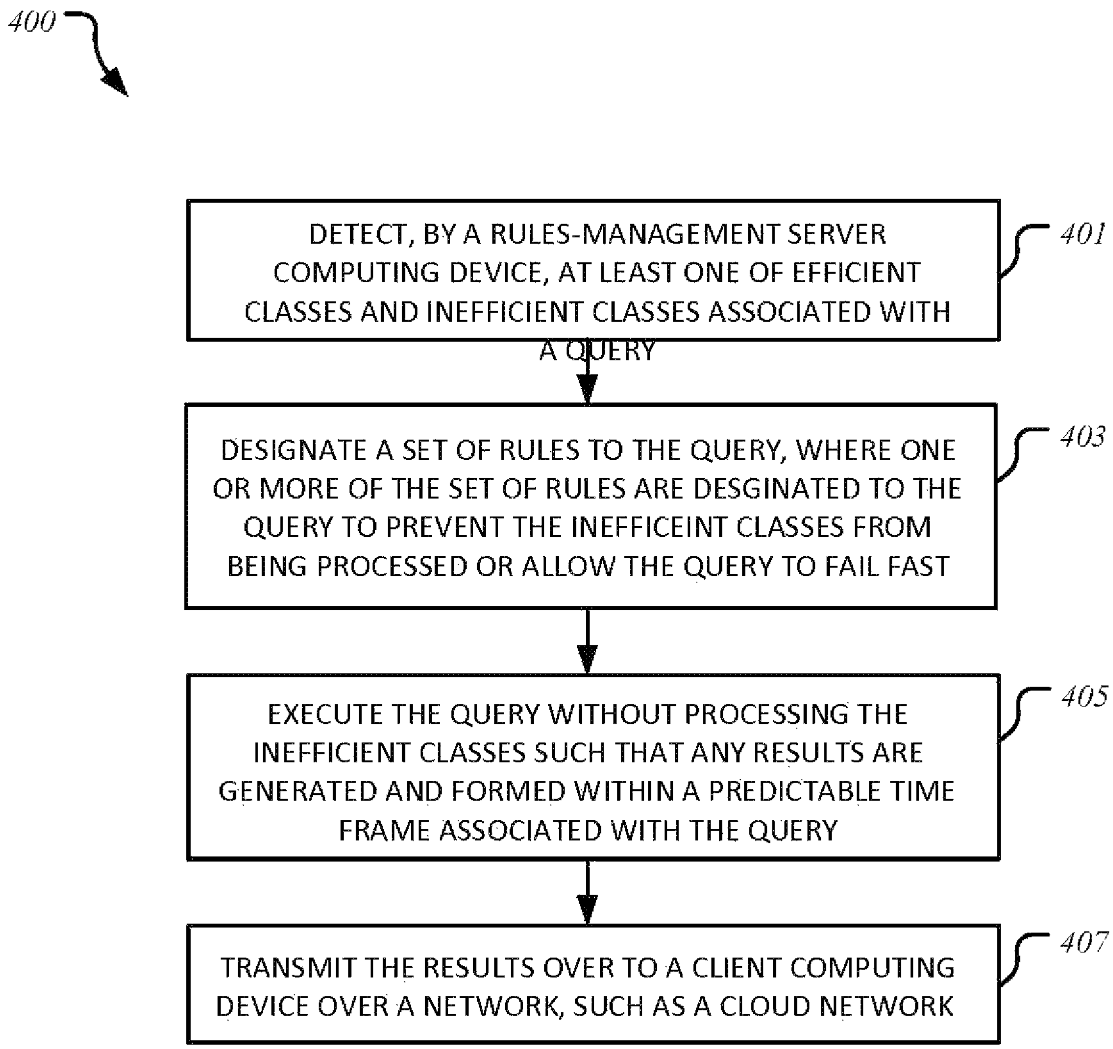
FIG. 4 illustrates a method for facilitating rules-based processing of queries according to one embodiment.

FIG. 4 illustrates a method 400 for facilitating rules-based processing of queries according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed or facilitated by one or more components of query mechanism 110 of FIGS. 1-3. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3 may not be repeated or discussed hereafter.

Method 400 begins at block 401 with detecting, by a rules-management server computing device, at least one of efficient classes and inefficient classes associated with a query, where the query is received from a client computing device over a network and placed by a user representing a tenant in a multi-tenant environment and having access to the client computing device. At block 403, a set of rules is designated to the query, where one or more of the set of rules are designated to the query to prevent the inefficient classes from being processed or allow the query to fail fast. In one embodiment, a query termed to be inefficient due to being associated with inefficient classes may be run without processing the inefficient classes or simply fail to ensure that other queries continue to run efficiently and the system is not bottlenecked from running of an inefficient query which may necessitate scanning of large portions or contents of data.

At block 405, in one embodiment, the query is executed without processing the inefficient classes such that any results are generated and formed within a predictable amount of time associated with the query. In one embodiment, this execution of the query may include accessing contents of one or more portions of one or more databases as identified by the set of rules. At block 407, the results may then be transmitted over to the client computing device over the communication network, such as a cloud network.

Figure 5:
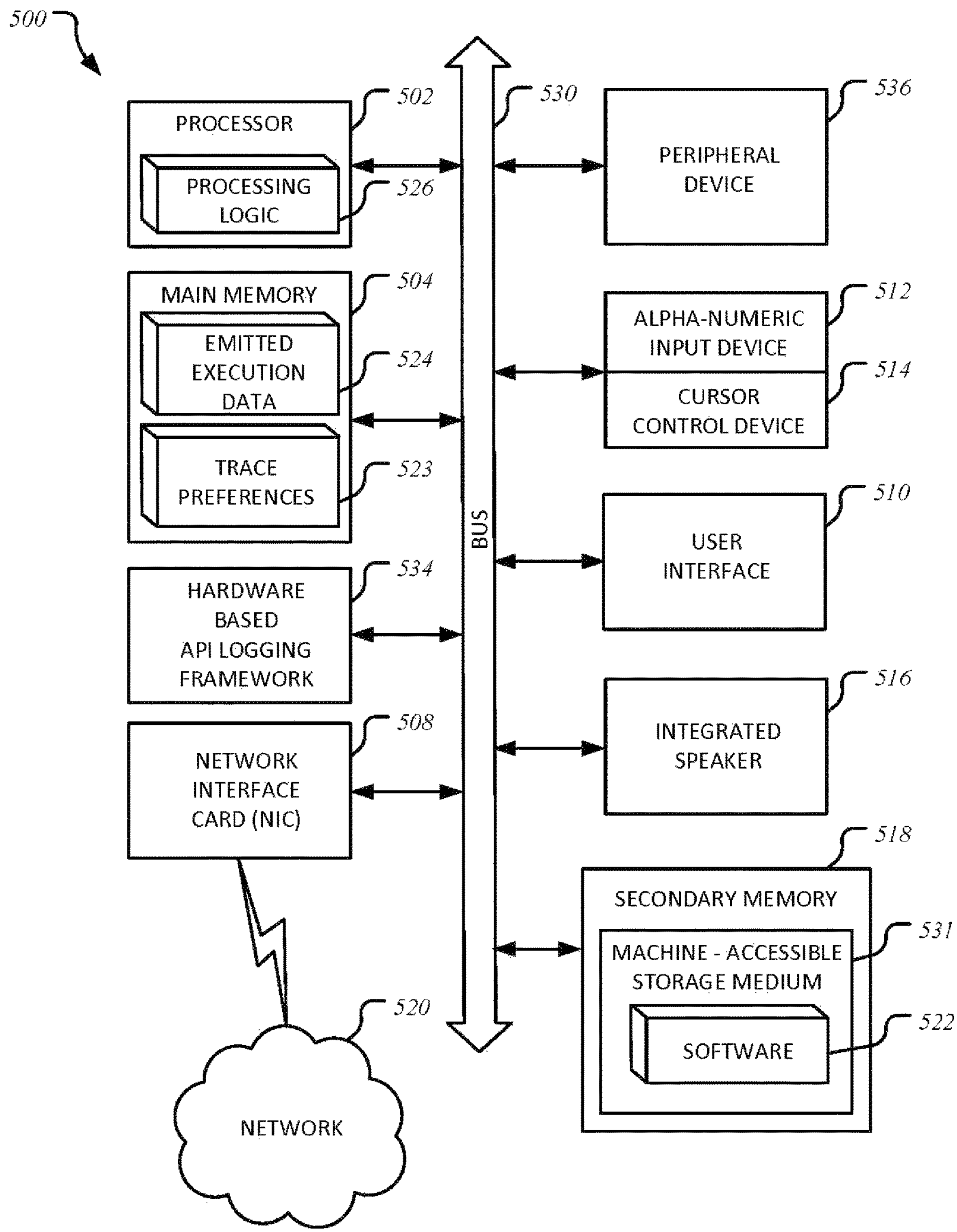
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network(s) 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets.

Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of query mechanism 110 as described with reference to FIG. 1 and other Figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of query mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer—readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
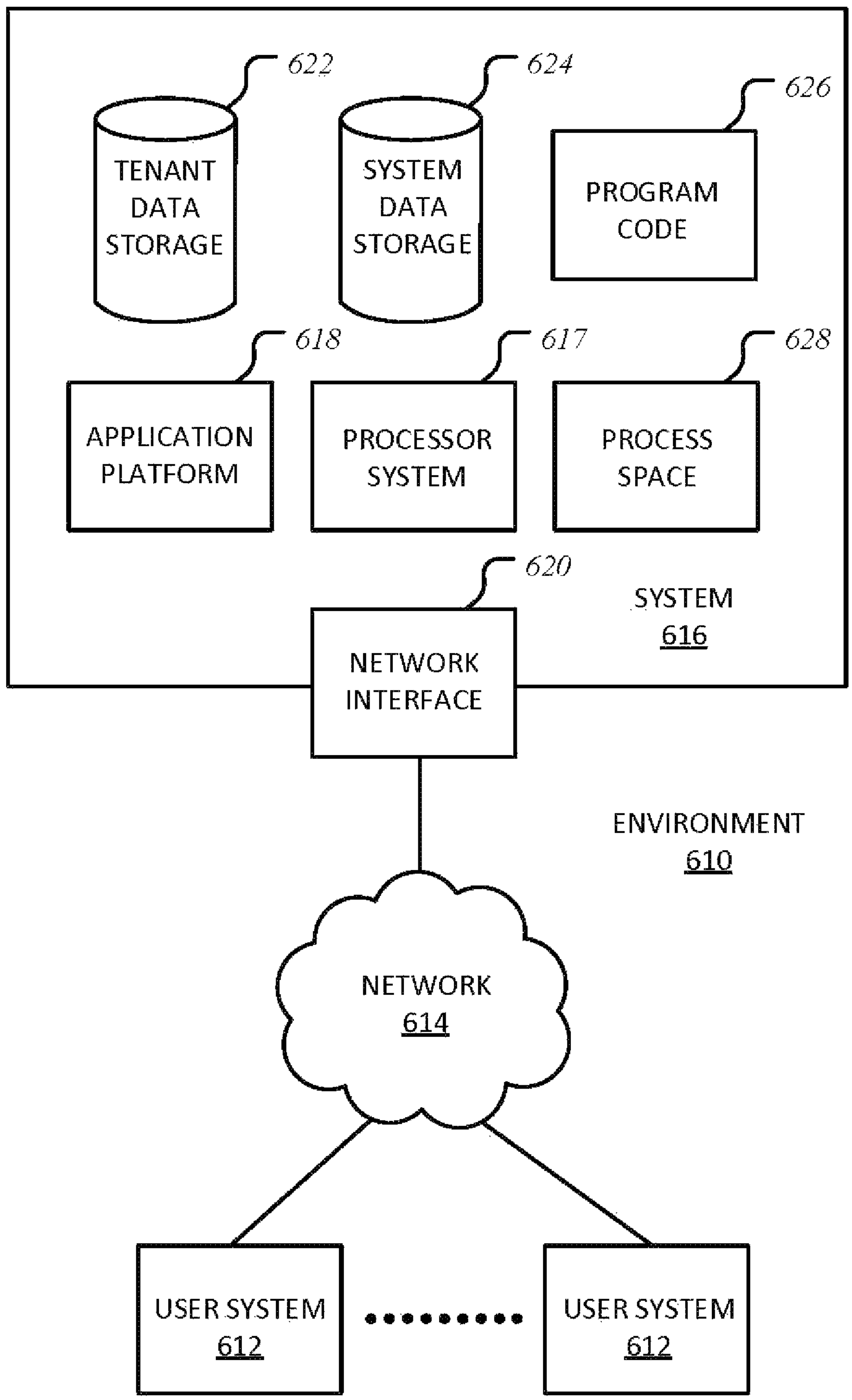
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a workstation, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third-party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third-party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database-indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
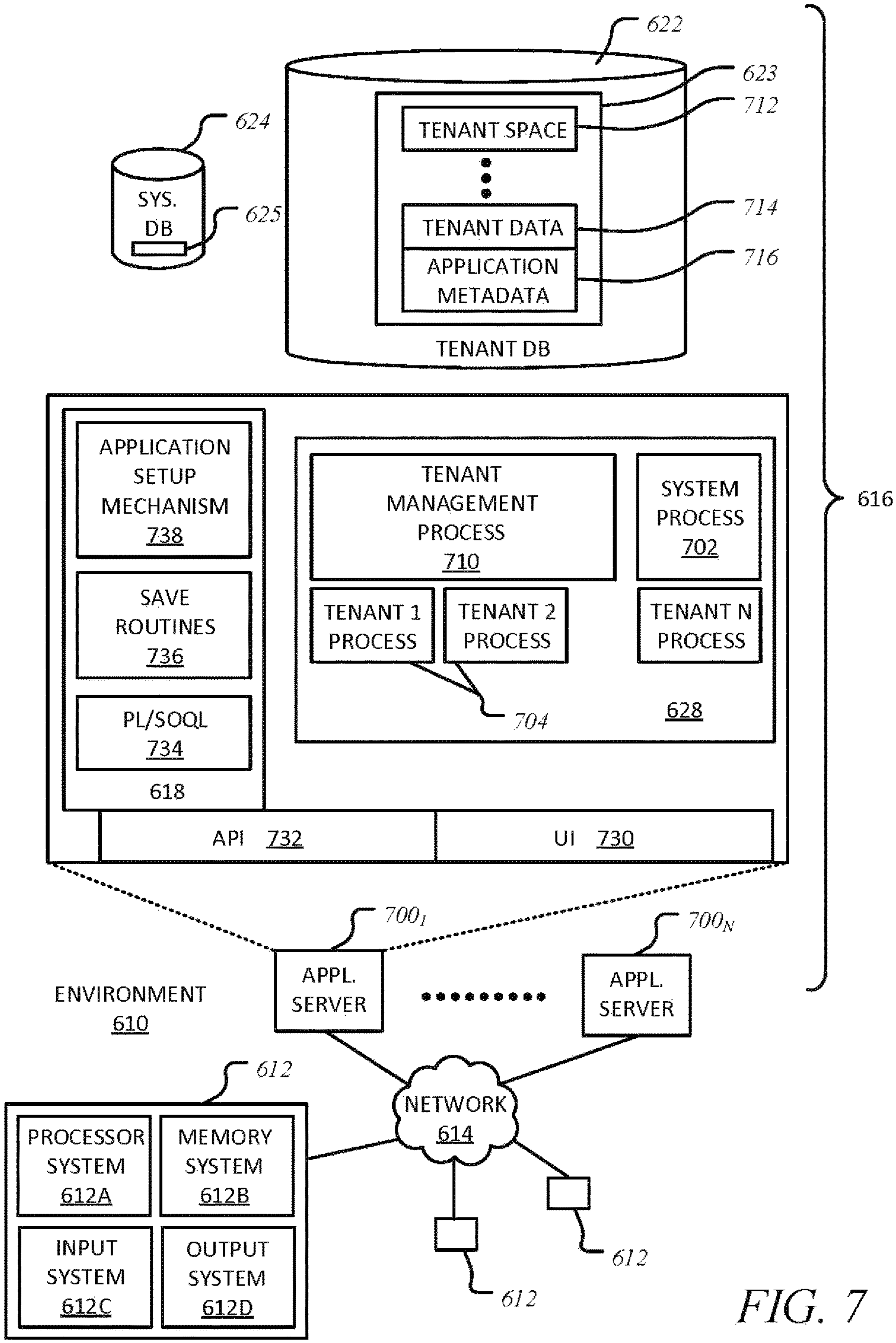
FIG. 7 illustrates the elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $\mathbf{700}_1$-$\mathbf{700}_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $\mathbf{700}_1$ might be coupled via the network 614 (e.g., the Internet), another application server $\mathbf{700}_{N-1}$ might be coupled via a direct network link, and another application server $\mathbf{700}_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 8:
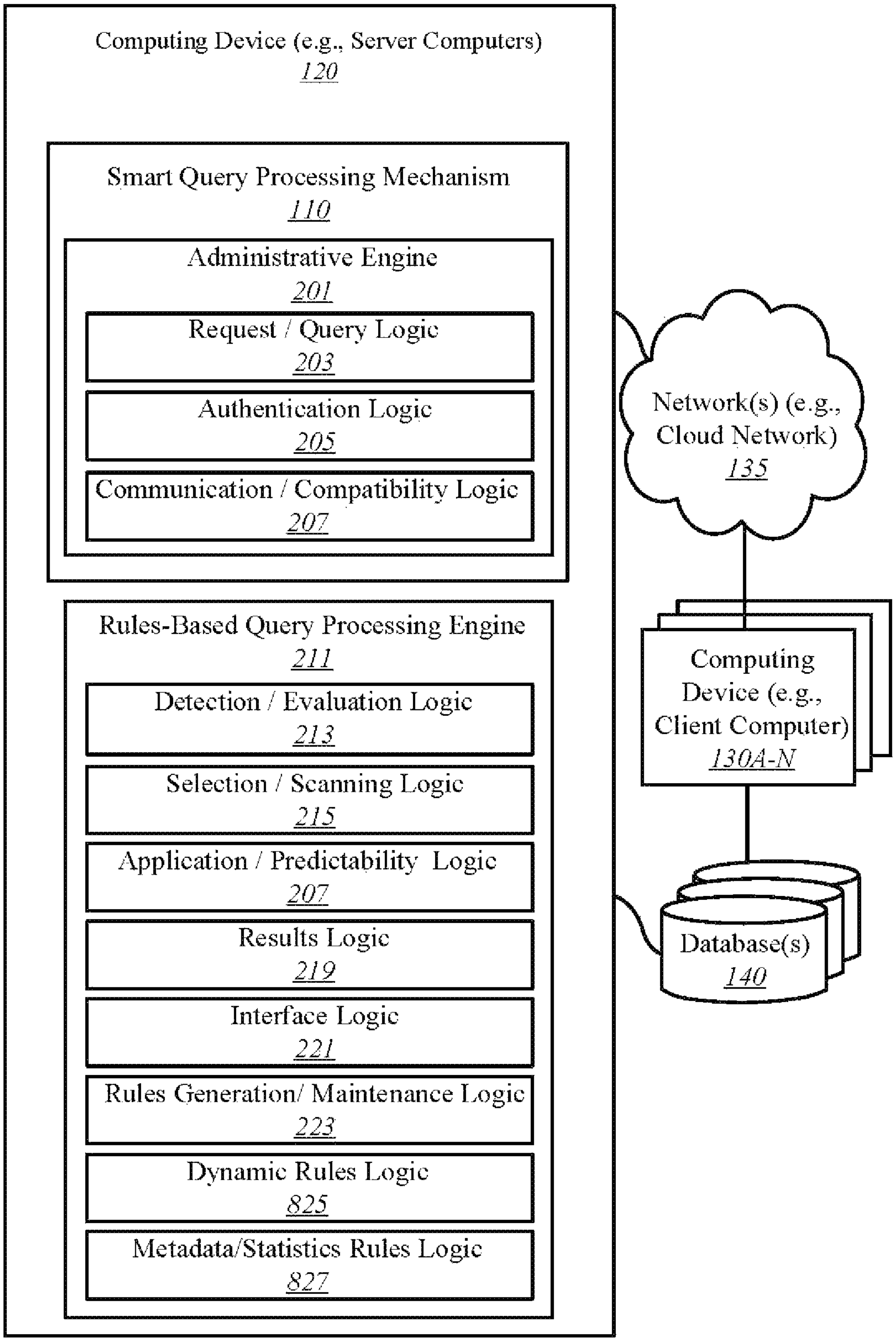
FIG. 8 illustrates smart query processing mechanism according to one embodiment.

FIG. 8 illustrates smart query processing mechanism 110 according to one embodiment. For brevity, many of components, features, and processes associated with smart query processing mechanism 110 already described with reference to FIGS. 1-7 are not repeated or discussed hereafter. That said, in one embodiment, rules engine 211 is shown as having dynamic rules logic 825 and metadata/statistics rules logic 827 that works with other components of rules engine 211, such as detection/evaluation logic 213, selection/scanning logic 215, application/predictability logic 217, results logic 219, interface logic 221, and rules generation/maintenance logic 223 to provide for additional novel features associated with dynamic selection and application of rules.

As previously mentioned, one of the fundamental problems with large data sets is the predictability of query times, such as when a synchronous query is issued, it is expected to return results within a predicable time frame that does not increase drastically as the underlying data set grows.

To ensure optimal queries are issued, embodiments provide for a novel technique for applying a series of rules to block known anti-patterns to facilitate the processing of queries within their respective predictable amounts of time. Embodiments further provide for a novel technique to move away from the conventional way of application of a rigorous set of rules for filtering around the row keys, such as when a synchronous query is run.

Embodiments provide for a novel technique for a consistent user experience, regardless of the size of the data. For example, queries issued against a test dataset of a single digit rows may be performed virtually the same way as a production query against billions of rows. Accordingly, in one embodiment, queries are prevented from unnecessarily scanning too much data and still performed within their expected time frames. In other words, striking a balance between deterministic query times and potential unbounded scanning.

Although certain range scans may seem innocuous, cases with high cardinality of columns within the key may cause issued, such as where a query may look simply, but cause scanning of millions of rows of data if, for example, events are occurring at multiple locations. This may be the case even if there are very few rows between the time range and further, the row cardinality may not be known at the query time. Further, although row key-based rules may be used for ensuring a deterministic query time regardless of data size, they are highly restrictive in guarding against the worst possible case. For example, the data to be scanned may be known and the query range may be appropriately filtered down enough based on the row key where a non-row kay filter is included.

Embodiments provide for a having more accurate estimates of a given query scan size, where this is used as a fail fast indicator of whether that query is efficient enough to allow to be run synchronously, while striking a balance between their query's deterministic times and its potential unbound scanning. Embodiments provide for a novel technique to ensure flexibility in query patterns, where the query response time is less than or equal to the predetermined or predictable time limit, and that runtime queries are performed using historical performance, metadata, statistics, etc.

For example, statistics may include partitioning of a key range space into equidistant markers and may further include information about data size and number of records per partition, where these statistics may be stored in a system statistics table. This table may be updated automatically, such as periodically or upon occurrence of an event, or manually, by simply requesting statistics update and providing the table name. Further, each individual partition in statistics may be monitored for size and table level configuration. The usage of these statistics may allow for improvement in performance for query parallelization and estimation of number of bytes used for scanning for a given query.

Similarly, in one embodiment, historical performance, metadata, statistics, etc., may be used to evaluate the complexity associated with each query, such as maximum number of bytes scannable within a time limit, estimated number of bytes to scan for a given query, when to fast fail query, when to process query, etc.

In one embodiment, as facilitate by dynamic rules logic 825, pertinent rules are selected from multiple sets of rules to the be dynamically applied to queries placed on behalf of tenants through client machines 130A-N such that the queries are processed during their predicable amount of time and without having to scan the entire contents of database 140. In one embodiment, these dynamically selected and applied rules are designed to prevent query classes that are known to be inefficient from running and consuming any amount of resources, such as bandwidth, time, threads, power, etc. In other words, these rules allow for queries to run in an efficient matter where not only their predictable time expectation is met, but it is done by performing fewest scans of the contents of database 140.

In one embodiment, upon receive a query, as detected by detection/evaluation logic 213, dynamic rules logic 825 is triggered to determine and evaluate any historical processing patterns associated with the query or other queries similar queries. For example, a historical pattern of a query may suggest some understanding in the order of columns associated with the query as a primary source of data relating to query efficiency. For example, the rules may revolve around the row key for the table being queried along with the SOQL grammar. More specifically, queries are often bounded by the columns position that are filtered out using various programming clauses. Such historical patterns can suggest the type and number of rules to be applied to the query so that it is processed efficiently without having to go through full or large-range scans of data.

In one embodiment, based on the historical patterns associated with a query, by knowing upfront the magnitude of the scan that the query may potentially produce, reasonable limits and fails can be determined and set prior to the execution of the query to prevent any unacceptable scenarios, as facilitated by dynamic rules logic 825. For example, having knowledge of how a query may perform on a current data set, dynamic rules logic 825 may trigger selection/scanning logic 215 to select certain rules to be applied to the query to ensure its performance within its predictable time frame and without any unnecessary scans of the data. These selected rules are then applied by application/predictability logic 217 and subsequently, results logic 219 is triggered to generate results from executing and processing the query based on the dynamic rules selection and application.

Further, in one embodiment, dynamic rules logic 825 include intelligence to consider the changing nature of queries as well as the data, where for example, a query's complexity may change as the data set grows. Regardless of the size of data or the complexity of a query, dynamic rules logic 825 ensures the pertinent rules are dynamically selected from multiple sets of rules to process the query to ensure timely execution with minimal scanning of the data.

It is contemplated and to be noted that this novel technique allows the query process to move away from the conventional rigid application of rules that left little room for maneuvering for the developers to ensure that the queries are performed in an efficient manner and in accordance with the service provider's delivery and performance goals and/or the tenants' needs and expectations. For example, this novel technique allows for the flexibility in process, documentation, and practices where the developers can tune the queries according to the specific goals, expectations, etc., as opposed to conventionally working with a highly restrictive set of technical rules that prevented the normal case from running. This novel technique also allows for supplementing this flexibility with a set of tools for use in triaging bugs and optimizing queries more effectively and efficiently.

It is contemplated that historical patterns may reveal any amount and type of data relating the processing of a query, such as deterministic query time, potentially unbound scans, number of bytes to be consumed in scanning, etc., along with other relevant information that may be used to compute the above-referenced information and/or other details about the query, such as any information in the historical pattern from client 130A-N about a query's row key space may be used to estimate how many bytes of data the query is likely to scan.

Embodiments further provide for a novel technique for computing statistics based on metadata about queries collected from one or more clients 130A-N. For example, in one embodiment, metadata/statistics rules logic 827 may be triggered to collect from clients 130A-N any metadata associated with queries, such as any information about row key hosts on each region, there the metadata is then used to compute or estimate process statistics about queries, as facilitate by metadata/statistics rules logic 827.

For example, any metadata about a query, such any information about a past performance of this query or that of another query similar to this one, may be collected by metadata/statistics rules logic 827 from one or more clients 130A-N and then used to compute more accurate and relevant statistics about the query, such determine a worst case estimate for a number of bytes this query is likely to consume in scanning of data. Such information may then be used by metadata/statistics rules logic 827 to place an upper bound on scanning for the expected performance for that query.

In one embodiment, by computing information based on or exacting from the metadata, metadata/statistics rules logic 827 can accurately determine the amount of resources needed (such as how many bytes to perform scans, how much time, etc.) to process a query to the strike a balance between the deterministic query times and the potentially bound scans associated with query. In one embodiment, metadata/statistics rules logic 827 then triggers selection/scanning logic 215 and application/predictability logic 217 to select and apply, respectively, metadata/statistics-based rules ("stat-based rules") execute and process the query. Subsequently, results logic 219 is used to generate results from the processing of the query, where these results are then compiled and sent to the user through one or more of client devices 130A-N as facilitated by results logic 219 and communication/compatibility logic 207.

It is contemplated and to be noted that embodiments are limited to collecting metadata from clients 130A-N and that in one embodiment, such metadata may be collected on the server-side, such as through server device 120. For example, each time a new information is collected or discovered about a query, that new metadata may serve as an update and supplement or replace the current information, such as a statistic update may be received in a synchronous fashion from clients 130A-N. This way, both server device 120 and clients 130A-N are aware of the update and any potential success or failures attributable to that update to provide its own level of resilience guarantees and acceptable levels of freshness. It is contemplated that such updates may be performed on-demand or periodically, such as over a period of minutes, hours, days, weeks, or even months, as determined or necessitated.

In some embodiments, rules engine 211 offers one or more tools to developers representing a service provider (e.g., Salesforce.com®) and/or users representing one or more tenants so help support and maintain an ecosystem that allows for a support experience for proactive encouragement of best practices, training, alerts, warnings, remediations, etc.

Figure 9A:
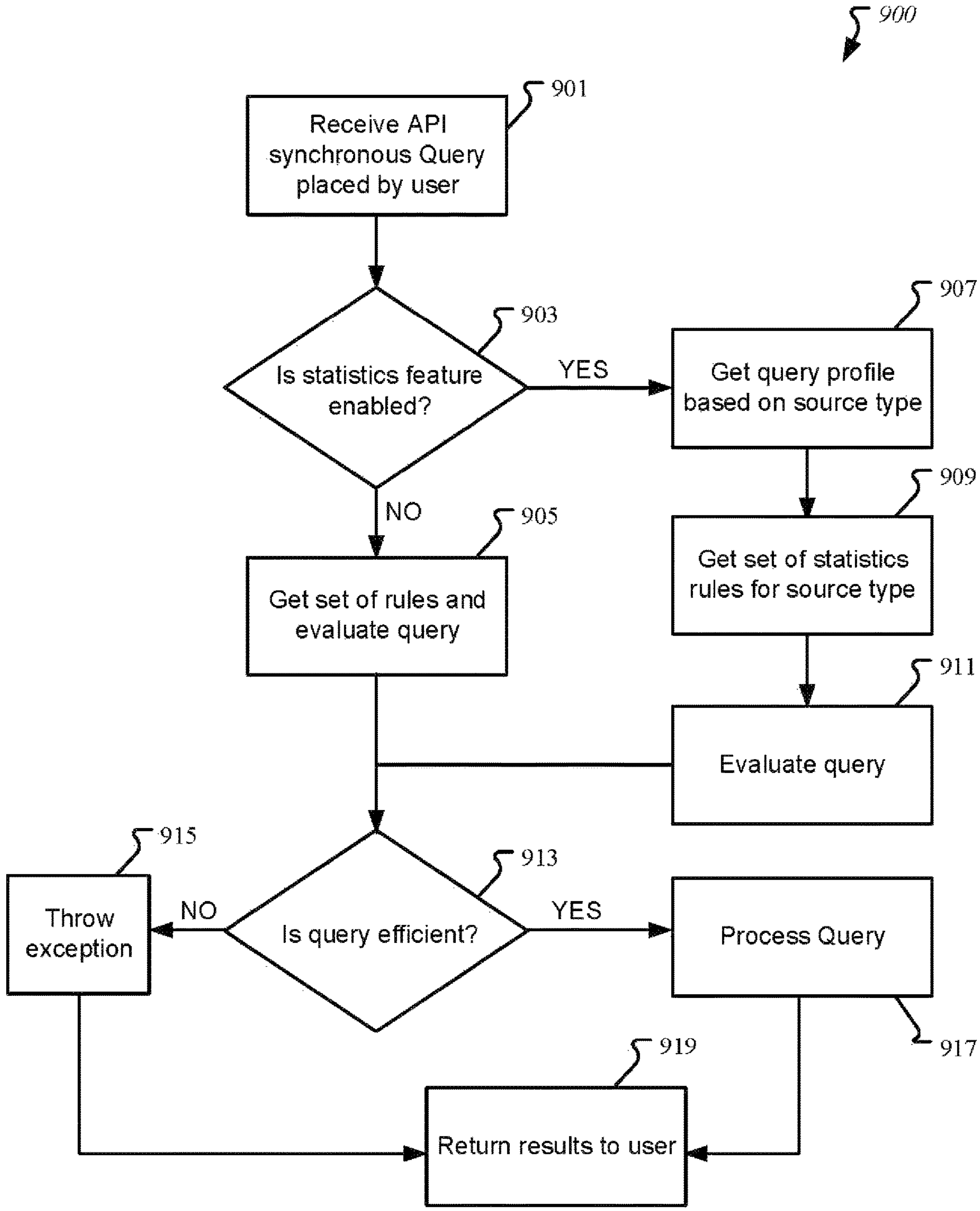
FIG. 9A illustrates a method for processing of synchronous queries using dynamic selection and application of rules and metadata-based statistics according to one embodiment.

FIG. 9A illustrates a method 900 for processing of synchronous queries using dynamic selection and application of rules and metadata-based statistics according to one embodiment. Method 900 may be performed by processing logic that may comprise hardware (e.g., circuitry, dedicated logic, programmable logic, etc.), software (such as instructions run on a processing device), or a combination thereof. In one embodiment, method 900 may be performed or facilitated by one or more components of smart query processing mechanism 110 of FIG. 8. The processes of method 900 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-8 may not be repeated or discussed hereafter.

Method 900 begins at block 901 with receiving of an application programming interface (API) synchronous query placed by a user, on behalf of a user, using a client computing device. At block 903, a determination is made as to whether the statistics feature is enabled. If not, method 900 continues with getting a set of rules for the query and evaluation of the query based on the set of rules at block 905. If, however, the statistics feature is enabled, then method 900 continues with getting a query profile based on the source type at block 907 and subsequently, getting of the relevant statistics rules for the source type at block 909. At block 911 the query is the evaluated based on the relevant statistics rules.

At block 913, another determination is made as to whether the query is efficient. If not, an exception is thrown at block 915 and this result is returned to the user at block 919. If, however, the query is efficient, the query is processed at block 917 and any pertinent results obtained from the processing of the query are returned to the user at block 919.

Figure 9B:
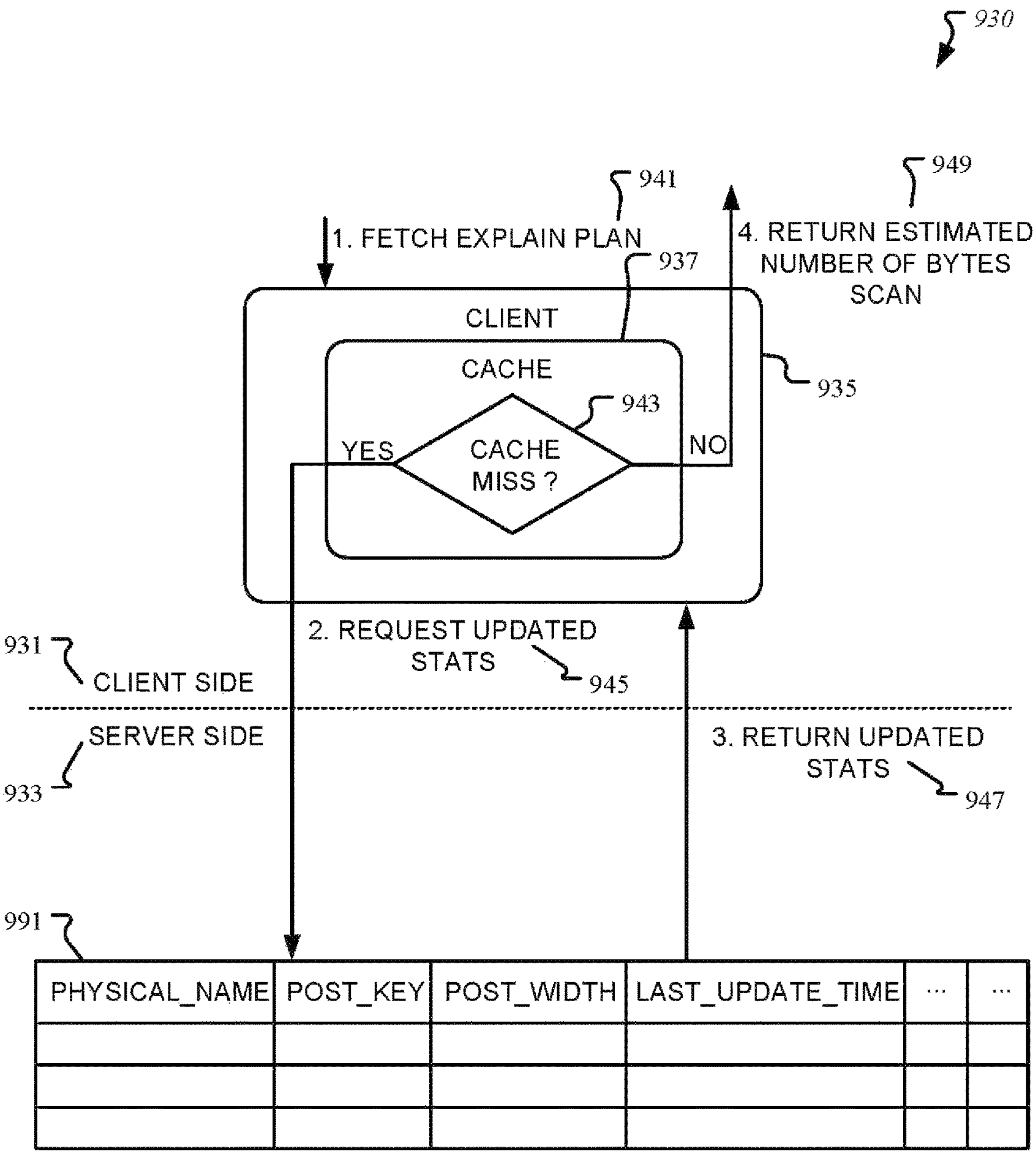
FIG. 9B illustrates a transaction sequence for processing of synchronous queries according to one embodiment.

FIG. 9B illustrates a transaction sequence 930 for processing of synchronous queries according to one embodiment. Transaction sequence 930 may be performed by processing logic that may comprise hardware (e.g., circuitry, dedicated logic, programmable logic, etc.), software (such as instructions run on a processing device), or a combination thereof. In one embodiment, transaction sequence 930 may be performed or facilitated by one or more components of smart query processing mechanism 110 of FIG. 8. The processes of method 930 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-9A may not be repeated or discussed hereafter.

As illustrated, transaction sequence 930 involves client-side 931 and server-side 933, where client-side 931 hosts one or more clients, such as client 935 that includes or is the same as one or more of clients 130A-N of FIG. 8, where server-side 933 hosts one or more statistics tables, such as table 939. As illustrated, transaction sequence 930 beings with fetching of an explain plan at 941 that is received at cache 937 where at block 943, a determination is made as to whether there is a cache miss. If yes, in one embodiment, transaction sequence 930 continues with requesting of updated statistics at 945 from table 939. In one embodiment, the updated statistics are returned to client at 947 and subsequently, any estimated number of bytes scan based on the updated statistics are returned at 949.

Figure 9C:
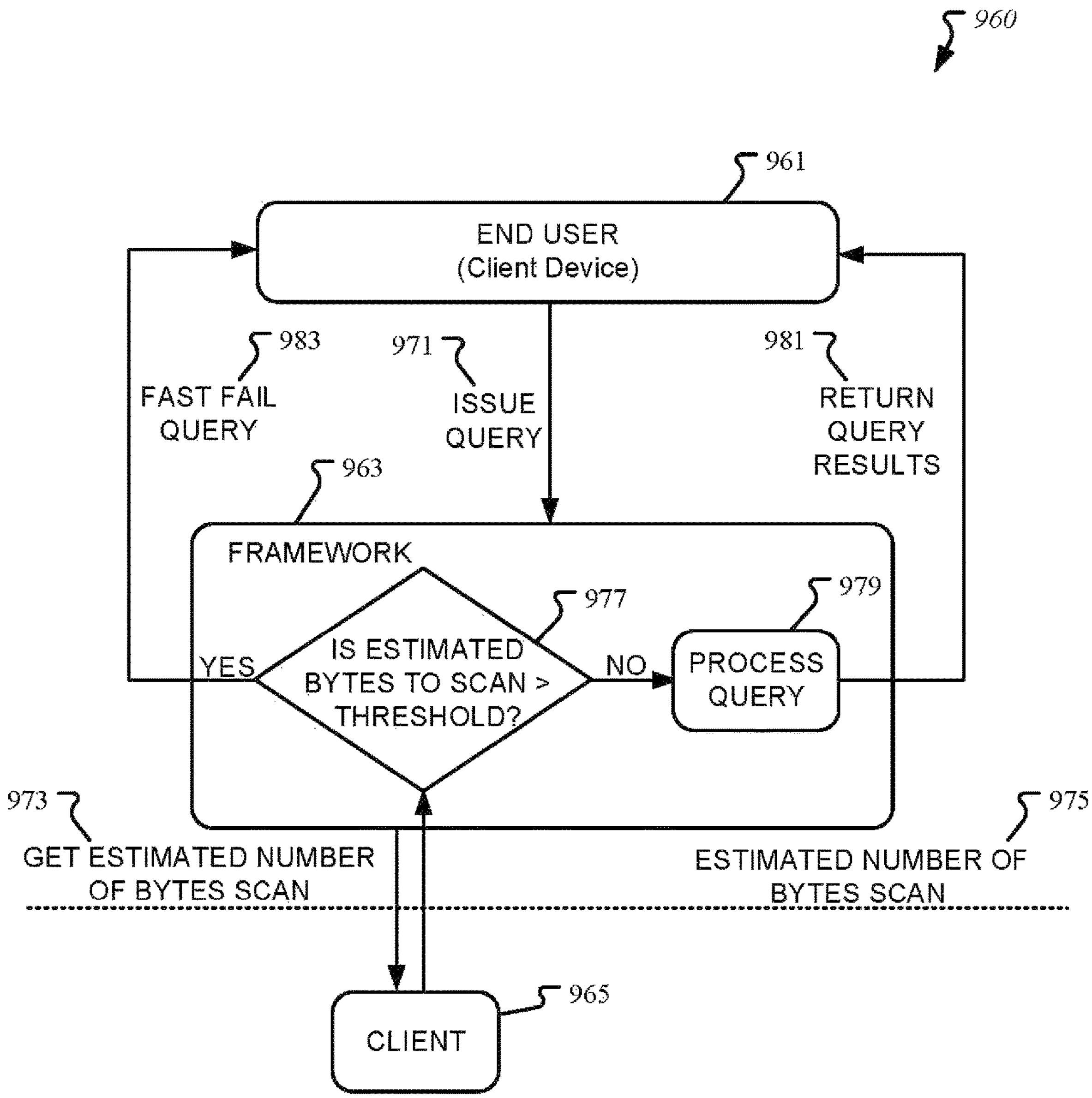
FIG. 9C illustrates a transaction sequence for processing of synchronous queries according to one embodiment.

FIG. 9C illustrates a transaction sequence 960 for processing of synchronous queries according to one embodiment. Transaction sequence 960 may be performed by processing logic that may comprise hardware (e.g., circuitry, dedicated logic, programmable logic, etc.), software (such as instructions run on a processing device), or a combination thereof. In one embodiment, transaction sequence 960 may be performed or facilitated by one or more components of smart query processing mechanism 110 of FIG. 8. The processes of method 960 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-9B may not be repeated or discussed hereafter.

As illustrated, in one embodiment, transaction sequence 960 begins with end-user 961, using one or more client devices like client devices 130A-N of FIG. 8, places or issues a query at 971. This query is received and processed at framework 963 at server device like server device 120 of FIG. 8, where framework 963 is supported and facilitated by smart query processing mechanism 110 having rules-based query processing engine 211 and dynamic rules logic 825 and metadata/statistics rules logic 827 of FIG. 8.

In the illustrated embodiment, framework 963 issues estimated number of bytes scan to client 965 which may be the same as the client accessible to user 961 and as one or more of clients 130A-N of FIG. 8. The estimated number of bytes scan are then returned at 975 from client 965 to framework 963, where at block 977, a determination is made as to whether the estimated bytes to scan is greater than a predetermined threshold. If yes, the decision results in a fast failure of the query at 983. If not, the query is processed at 979 and subsequently, any results obtained from the processing of the query are returned at 981 back to end-user 961 at a client device, such as client device 965, accessible to end-user 961.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method comprising: evaluating metadata associated with a query placed on behalf of a tenant in a multi-tenant environment; computing processing statistics for the query based on the metadata, wherein the processing statistics to identify a maximum number of scans of a database allocated to the query for gathering of data in processing of the query, wherein computing includes estimating a predictable amount of time for processing of the query using fewer than or equal to the allocated maximum number of scans of the database, wherein the allocated maximum number of scans is based on an estimated number of bytes based on a predetermined threshold of bytes to scan the query within the predictable amount of time based on the processing statistics, wherein the query is performed within the predictable amount of time when the estimated number of bytes is less than or equal to the predetermined threshold of bytes, wherein the processing statistics to identify one or more portions of the database subjects to the maximum number of scans without scanning other portions of the database; generating, based on the processing statistics, one or more processing rules, wherein the one or more processing rules are assigned to the query; and processing the query based on the assigned one or more rules such that the query is processed within the predictable amount of time and using fewer than or equal to the allocated maximum number of scans of the database.

2. The method of claim 1, further comprising:
- generating results based on processing of the query;
- transmitting the results to a client computing device over a communication network, wherein the query is received from the client computing device.

3. The method of claim 1, further comprising collecting the metadata from the client computing device, wherein the metadata contains information revealing one or more characteristics of the query.

4. The method of claim 1, wherein the processing statistics to further identify one or more portions of the database having contents pertinent to the query.

5. The method of claim 4, further comprising accessing the one or more portions of the database without having to scan or access scanning or accessing other portions of the database.

6. The method of claim 1, wherein the results are further generated based on efficient classes associated with the query and without having to access or process inefficient classes.

7. A database system comprising: a server computing device having a data processing device coupled to a memory, the data processing device to facilitate operations comprising: evaluating metadata associated with a query placed on behalf of a tenant in a multi-tenant environment; computing processing statistics for the query based on the metadata, wherein the processing statistics to identify a maximum number of scans of a database allocated to the query for gathering of data in processing of the query, wherein computing includes estimating a predictable amount of time for processing of the query using fewer than or equal to the allocated maximum number of scans of the database, wherein the allocated maximum number of scans is based on an estimated number of bytes based on a predetermined threshold of bytes to scan the query within the predictable amount of time based on the processing statistics, wherein the query is performed within the predictable amount of time when the estimated number of bytes is less than or equal to the predetermined threshold of bytes, wherein the processing statistics to identify one or more portions of the database subjects to the maximum number of scans without scanning other portions of the database; generating, based on the processing statistics, one or more processing rules, wherein the one or more processing rules are assigned to the query; and processing the query based on the assigned one or more rules such that the query is processed within the predictable amount of time and using fewer than or equal to the allocated maximum number of scans of the database.

8. The system of claim 7, wherein the operations further comprise:
- generating results based on processing of the query;
- transmitting the results to a client computing device over a communication network, wherein the query is received from the client computing device.

9. The system of claim 7, wherein the operations further comprise collecting the metadata from the client computing device, wherein the metadata contains information revealing one or more characteristics of the query.

10. The system of claim 7, wherein the processing statistics to further identify one or more portions of the database having contents pertinent to the query.

11. The system of claim 10, wherein the operations further comprise accessing the one or more portions of the database without having to scan or access other portions of the database.

12. The system of claim 7, wherein the results are further generated based on efficient classes associated with the query and without having to access or process inefficient classes.

13. A non-transitory computer-readable medium having stored thereon instructions which, when executed, cause a computing device to perform operations comprising: evaluating metadata associated with a query placed on behalf of a tenant in a multi-tenant environment; computing processing statistics for the query based on the metadata, wherein the processing statistics to identify a maximum number of scans of a database allocated to the query for gathering of data in processing of the query, wherein computing includes estimating a predictable amount of time for processing of the query using fewer than or equal to the allocated maximum number of scans of the database, wherein the allocated maximum number of scans is based on an estimated number of bytes based on a predetermined threshold of bytes to scan the query within the predictable amount of time based on the processing statistics, wherein the query is performed within the predictable amount of time when the estimated number of bytes is less than or equal to the predetermined threshold of bytes, wherein the processing statistics to identify one or more portions of the database subjects to the maximum number of scans without scanning other portions of the database; gathering, based on the processing statistics, one or more processing rules, wherein the one or more processing rules are assigned to the query; and processing the query based on the assigned one or more rules such that the query is processed within the predictable amount of time and using fewer than or equal to the allocated maximum number of scans of the database.

14. The non-transitory computer-readable medium of claim 13, wherein the operations further comprise:

generating results based on processing of the query;

transmitting the results to a client computing device over a communication network, wherein the query is received from the client computing device.

15. The non-transitory computer-readable medium of claim 13, wherein the operations further comprise collecting the metadata from the client computing device, wherein the metadata contains information revealing one or more characteristics of the query.

16. The non-transitory computer-readable medium of claim 13, wherein the processing statistics to further identify one or more portions of the database having contents pertinent to the query.

17. The non-transitory computer-readable medium of claim 16, wherein the operations further comprise accessing the one or more portions of the database without having to scan or access other portions of the database.

18. The non-transitory computer-readable medium of claim 13, wherein the results are further generated based on efficient classes associated with the query and without having to access or process inefficient classes.

* * * * *